UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

COMPOSITION FOR PRIMING AND COATING CONCRETE.

1,006,737.  Specification of Letters Patent.  Patented Oct. 24, 1911.

No Drawing.   Application filed July 14, 1911.  Serial No. 638,515.

*To all whom it may concern:*

Be it known that I, CARLETON ELLIS, a citizen of the United States, and a resident of Montclair, in the county of Essex and State of New Jersey, have invented certain new and useful Improvements in Composition for Priming and Coating Concrete, of which the following is a specification.

This invention relates to a composition for coating cement or concrete and relates especially to compositions intended particularly for filling or priming the surface of concrete preparatory to finishing the surface with ordinary paints, varnishes or enamels; all as more fully hereinafter set forth and as claimed.

Ordinary Portland cement contains a considerable quantity of free alkali in the form of lime, potash and soda. Other calcareous cements also have this alkaline nature. It is difficult indeed to paint surfaces of concrete or calcareous cement with ordinary oil paints for the reason that the free alkali present saponifies the glycerids of the oil vehicle used, at once destroying such oil vehicle and setting free glycerin. This glycerin, being substantially insoluble in the oil and fatty products of saponification, remains in the coating as such, making it porous and hygroscopic. Such oil paints therefore do not adhere well nor do they remain on the painted surface for any length of time, scaling and cracking off.

In order to overcome the difficulties attendant on the painting of concrete surfaces, various preliminary washes have been used thereon without very satisfactory results. For instance, the concrete surface is sometimes treated with a preliminary wash of dilute hydrochloric acid for the purpose of removing the free lime and other alkali. This however, has a number of disadvantages since it destroys the bonding of the cement, thereby weakening the surface layer and causing scaling and chipping of the cement and aggregate. Other strong acids, such as oxalic acid have been tried without satisfactory results. A number of acid salts, such as sulfate of zinc, alum and the like have been used in aqueous solution but the necessity of applying such solutions separately, as an operation distinct from the application of the paint coating, together with the delay incident on the drying out of the moisture introduced with the acid salt treatment and injury to the bonding of the cement due to double decomposition with the components of the cement, whereby loose and pulverulent substances are formed, has practically offset any gain derived from neutralizing action. Solutions of ammonium carbonate have been tried for the purpose of converting the lime into carbonate of lime and though these solutions are fairly satisfactory yet they are expensive and the manipulation incident thereto is also expensive.

It is the object of the present invention to treat a concrete surface with a composition which will at once form a coating thereon and neutralize the alkalinity of the concrete surface without production of crumbling substances which would cause scaling and cracking of the coated surface. Concrete is a fairly porous material as ordinarily prepared and absorbs oils very easily by capillary action. This action is known in the trade as "suction" and for the preliminary coating of concrete, oils are needed which resist suction to a considerable degree.

It is also the object of the present invention to indicate a means of securing a composition resistant to suction which has the properties requisite for application to so alkaline a material as concrete. As a basis for such compositions I preferably make use of an unsaponifiable or substantially unsaponifiable resinous body, such as Jellutong or Pontianak rubber resin.

Most of the resins used in the making of varnishes and paint oils contain a large percentage of free resin acids and esters which are readily saponified by boiling alcoholic potash but which are slowly saponified by the alkalis of cement. In neutralizing a concrete surface with an acid composition which also forms a water-resistant coating, the speed of neutralization has to be considered. If the acid component acts rapidly, neutralization is effected before the coating has set and dried. If the action of the acid component is slow, neutralization and reaction may go on after the setting and drying of the composition, thus causing rupturing of the coating and its ultimate destruction. The resin acids differ from the fatty acids in this respect. They are slower in neutralizing activity than the fatty acids, so slow in fact that a coating compound has opportunity to dry and harden before neutralizing reactions are fairly under way and these subsequently progress to the detriment of the coating.
The fats are bodies of synthetic origin and as glycerids form well characterized bodies. The resins are largely bodies resulting from condensation, are very fluctuating in composition and the nature of their components is not at all well established at the present time. The copals, which are so extensively used in varnish making, fluctuate in composition very greatly. Manila copal, for example, may have an acid number of 135 and a saponification value of 185, while Angola copal will perhaps give an acid number of 60 and a saponification value of 135. Borneo copal will give an acid number of about 145 and a saponification value of 180. Amber contains about 30% resin acids and nearly 70% of saponifiable esters. Common rosin has an acid number of about 140 although this varies with different grades. It consists largely of abietic acid or its anhydrid. Sandarac has an acid number of about 150. The uncertain composition of resins makes all these figures of indifferent value and the variations in ester value and acidity, together with the further changes taking place in the fusing or melting of the hard gums or resins, preparatory to mixing with oils or thinners, leaves in doubt, always, the action of the resin acids and esters on the alkali of cement. The use therefore of "short oil varnishes," that is varnishes high in saponifiable resin and low in oil, for coating cement is only a makeshift at best. The fatty acids from ordinary fats, including such acids as stearic, palmitic and oleic, are more rapid in their neutralizing action and are more homogeneous in composition so that their reaction with cement alkali is more effective and decisive. The same is true of the fatty acids of drying oils such as linseed and tung or soya bean oil or of the slower drying oils like cotton seed and corn oil. The fatty acids of the drying oils have the advantage that after neutralizing the superficial alkali, forming in the main a lime soap of a water insoluble character, drying sets in and a more resistant body is produced. The lime soaps of the resins, are prone to hydrolysis while the same is true to some extent of the soaps of the non-drying oils. The drying oils are better adapted to resist the hydrolyzing action of moisture as their lime soaps formed in the cement by the action of their fatty acids on oxidation or drying do not exhibit the same hydrolyzable tendencies.

Of the drying oils the acid derived from tung oil is most satisfactory for the purposes of the present invention. The lime tungate which forms on applying the tung acid to concrete has excellent waterproofing qualities. Second in this respect are the acids of fish and linseed oils. Besides the acid bodies which unite with free lime to produce water-insoluble bodies there are other organic acids such as acetic and formic acids which yield water soluble compounds. Concentrated acetic acid is readily miscible with the thinners employed in making certain of the compositions under the present invention and may be used in moderate amounts under some conditions. Other acid bodies which may be used are sulfonic acids and the markedly acid nitro derivatives of the aromatic series. Hydrochloric acid in gaseous form may be used to saturate the coating mixture, but as stated, this acid has a tendency to injure the bond of the cement aggregate. Oxalic acid is not soluble in oils and cannot therefore be readily used or uniformly applied in the present compositions. The acid neutralizers therefore fall into two classes, viz;—those that form water-soluble and those that form water insoluble lime salts or compounds. The latter group further subdivides into the drying and the non-drying compounds and into the rapidly-neutralizing and slowly-neutralizing bodies.

In an application entitled Cement primer, filed May 24, 1909, Serial No. 497,934; application for Binding and coating composition, filed Mar. 29, 1910, Serial No. 552,178; application for Coated concrete, filed Oct. 22, 1910, Serial No. 588,549; application for Waterproof coating for concrete, etc., filed Feb. 16, 1911, Serial No. 608,888 and application for Concrete and stucco paint oil, filed May 20, 1911, Serial No. 628,577, I have set forth the use of fatty acid neutralizers and unsaponifiable or substantially unsaponifiable resinous bodies with or without colloidal thickeners for priming or coating concrete and have set forth in particular the advantages of Jellutong or Pontianak rubber resin for this purpose. The present application contains matter derived from these applications and is therefore to a certain extent a divisional continuation of said applications.

Jellutong resin is a waste or by-product derived from the deresination of rubber and its resistance to alkali makes it especially useful for the coating of concrete. This alkali-proof quality apparently resides in the almost complete absence of the acids and esters ordinarily found in varnish resins and in the presence, seemingly, of a large proportion of resistant hydrocarbons derived from the oxidation of rubber. These rubber resins are not readily soluble in benzin, turpentine and the other usual varnish thinners to form stable solutions and the heat treatment to which ordinary varnish gums are subjected in the manufacture of varnishes does not suffice to make solutions which are entirely satisfactory. Pontianak resin may be put into solution in benzin by first heating the resin to 600° F. or higher for about one hour or until a loss in weight of about 20% results. Longer heating at lower temperatures also accomplishes the same result although less effectively. At 400° F. the heat treatment should be maintained for about 18 hours to secure the desired reformation of the resin. At 450° F. twelve hours heating is sufficient. At these lower temperatures the loss by distillation is much less. The product at 400° F. loses only 5% in 18 hours as compared with a loss of 20% for one hour at 600° F.–625° F. Blowing air into the hot resin shortens the process. This is a dangerous procedure at 600° F. but may be carried out at 400° F. without ignition of the resin. The operation probably is one of oxidation, whereby the transition products between rubber and rubber resin are destroyed or converted into more soluble bodies. The raw resin is more soluble in benzol and coal tar hydrocarbons than in petroleum thinners but the latter are more acceptable to the paint trade through the customary use of benzin and light kerosenes as paint thinners. Mixtures of benzol and benzin serve well, especially on the resin products prepared by heat-treatment at around 400° F. with aeration.

A colloidal thickener for the solutions is required for very porous concrete, as the rubber resin solutions as usually prepared have rather slight body. To prevent suction on the work the addition of such colloids as polymerized oils, aluminum tungate or the aluminum soap of fish oil or the corresponding calcium compounds is serviceable. Rubber also may be used as a colloiding material. Certain waxes may be used in moderate amount, although not as satisfactory for this specific purpose as the above mentioned colloids. Saponifiable waxes such as beeswax which have a slow neutralizing action on the free alkali of concrete are not as effective as the inert waxes like ceresin. Montan wax or montanic acid may however be used to advantage in some cases.

A suitable composition of an illustrative character is made by melting 10 parts of Pontianak resin, adding 5 parts of tung acid, 3 parts of aluminum soap of fish oil, 1 part of drier and 20 parts of benzol. Another composition is made from 10 parts of "air-blown" Pontianak resin heated to 400° F. for three hours, 10 parts tung acid, 1 part aluminum tungate, 2 parts rubber, 1 part drier, 1 part ceresin, 10 parts benzol and 12 parts benzin. Another composition is made from 10 parts of the rubber resin, 3 parts rubber, 2 parts ceresin wax, 2 parts montanic acid, 3 parts fish oil acid and hydrocarbon thinner 20 parts. Another composition is prepared from Pontianak resin heated to 600° F. for one hour 15 parts, glacial acetic acid ½ part, tung acid 5 parts, aluminum tungate 1 part, calcium soap of fish oil 2 parts, wax 1 part and heavy benzin 20 parts. Still another composition is made from Pontianak resin 10 parts, tung acid 7 parts, soya bean oil 3 parts and hydrocarbon thinner 20 parts. A simple composition suitable when suction is not in evidence is prepared from 10 parts of Pontianak resin, 1 part drier, 7 parts of tung acid and 20 parts of hydrocarbon thinner.

To recapitulate, my invention has to do with a concrete coating particularly suitable as a priming coat so as to prepare the surface for subsequent painting with linseed oil paints or enamels and the like and specifically concerns the use as a basis, of a substantially unsaponifiable resinous body lending stability to the composition; of an acid body miscible with the solvents employed, which acid body preferably is capable of rapidly neutralizing the alkalis of cement, preferably forms a water-insoluble compound and preferably one resistant to hydrolytic action; and further, the addition, preferably, of a colloid thickener to overcome or resist the suction of porous concrete.

It should be understood that I do not wish to limit myself to the precise ingredients described in the foregoing but may invoke the doctrine of equivalency as far as the same may be herein applicable. For example, additions of saponifiable resins, such as kauri copal may be made to a greater or less extent depending on the age of the concrete and on the mass or relative proportion of unsaponifiable resin present. A large amount of Pontianak resin may embed, as it were, a small amount of colophony or kauri and thus for a long time protect these more susceptible bodies from the action of alkali.

What I claim is:—

1. A cement coating composition comprising essentially a substantially unsaponifiable resinous body, a thinner and an acid body miscible with said thinner.

2. A cement coating composition comprising essentially a substantially unsaponifiable resinous body, a thinner and an acid body miscible with said thinner and capable of readily uniting with the free alkali of calcareous cement.

3. A cement coating composition consisting of a liquid comprising essentially a substantially unsaponifiable resinous body and a cement-alkali neutralizing body.

4. A cement coating composition comprising Jellutong rubber resin, a thinner and an acid body miscible with said thinner.

5. A cement coating composition comprising Pontianak rubber resin, a solvent therefor, a cement-alkali neutralizing body and a colloidal thickener.

Signed at Chesham in the county of Cheshire and State of New Hamp. this 7th day of July A. D. 1911.

CARLETON ELLIS.

Witnesses:
BIRDELLA M. ELLIS,
JUDSON N. WALKER.